(12) United States Patent
Müller (10) Patent No.: US 7,356,504 B2
(45) Date of Patent: Apr. 8, 2008

(54) METHODS FOR DETERMINING VALUE AT RISK

(75) Inventor: Ulrich A. Müller, Zurich (CH)

(73) Assignee: The Olsen Group (CH)

( * ) Notice: Subject to any disclaimer, the term of this patent is extended or adjusted under 35 U.S.C. 154(b) by 1297 days.

(21) Appl. No.: 09/842,438

(22) Filed: Apr. 26, 2001

(65) Prior Publication Data

US 2002/0019803 A1    Feb. 14, 2002

Related U.S. Application Data

(60) Provisional application No. 60/274,174, filed on Mar. 8, 2001, provisional application No. 60/200,743, filed on May 1, 2000, provisional application No. 60/200,742, filed on May 1, 2000.

(51) Int. Cl.
*G06Q 40/00*    (2006.01)

(52) U.S. Cl. .............................. 705/38; 705/35; 705/36; 705/37; 705/39; 705/40; 702/179; 702/194

(58) Field of Classification Search .................. 705/38, 705/39–40; 702/194, 179
See application file for complete search history.

(56) References Cited

U.S. PATENT DOCUMENTS

| | | | | |
|---|---|---|---|---|
| 5,819,237 A | * | 10/1998 | Garman | 705/36 R |
| 6,085,175 A | * | 7/2000 | Gugel et al. | 705/36 R |
| 6,122,623 A | * | 9/2000 | Garman | 705/36 R |
| 6,321,212 B1 | * | 11/2001 | Lange | 705/36 R |
| 6,360,210 B1 | * | 3/2002 | Wallman | 705/36 R |
| 6,768,969 B1 | * | 7/2004 | Nikitin et al. | 702/188 |
| 2003/0144936 A1 | * | 7/2003 | Sloan et al. | 705/36 |

OTHER PUBLICATIONS

Dacorogna M.M., Müller U.A., Nagler R.J., Olsen R.B., and Pictet O.V., 1993 "A Geographical Model for the Daily and Weekly Seasonal Volatility in the FX Market," *Journal of International Money and Finance*, 12(4), 413-438.

Dacorogna M.M., Müller U.A., Olsen R.B., and Pictet O.V., 1998, "Modeling Short-Term Volatility with GARCH and HARCH Models" published in *Nonlinear Modeling of High Frequency Financial Time Series*, ed. by Christian Dunis and Bin Zhou; John Wiley, Chichester, 161-176.

(Continued)

*Primary Examiner*—Frantzy Poinvil
*Assistant Examiner*—Timothy M. Harbeck
(74) *Attorney, Agent, or Firm*—Morgan, Lewis & Bockius LLP (57) ABSTRACT

A preferred embodiment comprises a method for determining value-at-risk based on tick-by-tick financial data. Major steps of the method comprise the following: (1) financial market transaction data is electronically received by a computer; (2) the received financial market transaction data is electronically; (3) a time series z is constructed that models the received financial market transaction data; (4) an exponential moving average operator is constructed; (5) an operator is constructed that is based on the exponential moving average operator; (6) a causal operator $\Omega[z]$ is constructed that is based on the iterated exponential moving average operator; (7) values of predictive factors are calculated; (8) the values calculated by the computer are stored in a computer readable medium, and (9) value-at-risk is calculated from the values stored in step (8).

11 Claims, 9 Drawing Sheets

OTHER PUBLICATIONS

Granger C.W.J. and Newbold P., 1977, *Forecasting Economic Time Series*, Academic Press, London.

Hamilton J.D., 1994, *Time Series Analysis*, Princeton University Press, Princeton New Jersey.

McNeil A.J. and Frey R., 1998, "Estimation of Tail-Related Risk Measures for Heteroscedastic Financial Time Series: An Extreme Value Approach," Preprint from the ETH Zürich, Aug. 27, 1-28.

J.P. Morgan, 1996, "RiskMetrics"—Technical Document, Technical Report, J.P. Morgan and International Marketing—Reuters Ltd.

Müller U.A., Dacorogna M.M., Davé R.D., Olsen R.B., Pictet O.V., and von Weizsäcker J.E., 1996, "Volatilities of Different Resolutions—Analyzing the Dynamics of Market Components," *Journal of Empirical Finance*, 4(2-3), 213-239.

Pictet O.V., Dacorogna M.M., Müller U.A., Olsen R.B., and Ward J.R., 1992, "Real-Time Trading Models for Foreign Exchange Rates," *Neural Network World*, 2(6), 713-744.

Priestly M.B., 1989, *Non-Linear and Non-Stationary Time Series Analysis*, Academic Press, London.

Hull, J.C., *Options, Futures and Other Derivatives*, (4th ed.) Prentice Hall, 1999, Ch. 14.

Pictet O.V., Dacorogna M.M., Müller U.A., "Hill, Bootstrap and Jackknife Estimators for Heavy Tails", in *A Practical Guide to Heavy Tails: Statistical Techniques for Analyzing Heavy Tailed Distributions*, R.J. Adler, R.E. Feldman & M.S. Taqqu (eds.), Birkhauser, Boston 1998.

Müller U.A., Dacorogna M.M., Pictet O.V., "Heavy Tails in High-Frequency Financial Data", in *A Practical Guide to Heavy Tails: Statistical Techniques for Analyzing Heavy Tailed Distributions*, R.J. Adler, R.E. Feldman & M.S. Taqqu (eds.), Birkhauser, Boston 1998.

Dacorogna M.M., Gencay R., Muller, U., Olsen, R.B. and Pictet, O.V., *An Introduction to High Frequency Finance*, Academic Press 2001, Ch. 9.

Britten-Jones M., Schaefer S.M., "Non-Linear Value-at-Risk," *European Finance Review*, 1999, 2 (2).

\* cited by examiner

METHODS FOR DETERMINING VALUE AT RISK

CROSS-REFERENCE TO RELATED APPLICATIONS

This application claims priority to U.S. Provisional Application No. 60/200,742, filed May 1, 2000; U.S. Provisional Application No. 60/200,743, filed May 1, 2000; U.S. Provisional Application No. 60/200,744, filed May 1, 2000; and U.S. Provisional Application No. 60/274,174, filed Mar. 8, 2001. The contents of the above applications are incorporated herein in their entirety by reference.

BACKGROUND

For banks and other financial institutions, risk measurement plays a central role. Risk levels must conform to the capital adequacy rule. An error in the computed risk level may thus affect a bank's investment strategy. The state of the art is measuring risk by analyzing daily data: using one market price per working day and per financial instrument. In this description, the stochastic error of such a risk measure is demonstrated in a new way, concluding that using only daily data is insufficient.

The challenge for statisticians is to analyze the limitations of risk measures based on daily data and to develop better methods based on high-frequency data. This description meets this challenge by introducing the time series operator method, applying it to risk measurement and showing its superiority when compared to a traditional method based on daily data.

Intra-day, high frequency data is available from many financial markets nowadays. Many time series can be obtained at tick-by-tick frequency, including every quote or transaction price of the market. These time series are inhomogeneous because market ticks arrive at random times. Irregularly spaced series are called inhomogeneous, regularly spaced series are homogeneous. An example of a homogeneous time series is a series of daily data, where the data points are separated by one day (on a business time scale which omits the weekends and holidays).

Inhomogeneous time series by themselves are conceptually simple; the difficulty lies in efficiently extracting and computing information from them. In most standard books on time series analysis, the field of time series is restricted to homogeneous time series already in the introduction (see, e.g., Granger C. W. J. and Newbold P., 1977, *Forecasting economic time series,* Academic Press, London; Priestley M. B., 1989, *Non-linear and non-stationary time series analysis,* Academic Press, London; Hamilton J. D., 1994, *Time Series Analysis,* Princeton University Press, Princeton, N.J.) (hereinafter, respectively, Granger and Newbold, 1977; Priestley, 1989; Hamilton, 1994). This restriction induces numerous simplifications, both conceptually and computationally, and was almost inevitable before cheap computers and high-frequency time series were available.

SUMMARY

U.S. Provisional Application No. 60/200,743, filed May 1, 2000, discloses a new time series operator technique, together with a computationally efficient toolbox, to directly analyze and model inhomogeneous as well as homogeneous time series. This method has many applications, among them volatility or Value-at-Risk (VaR) computations tick by tick.

A comparison is made herein between VaR results based on daily data, sampled at a certain daytime, and results based on tick-by-tick data and the new time series operator technique. If using daily data, a surprising and (for practitioners) alarming sensitivity against the choice of the sampling daytime is observed. The stochastic noise seems higher than acceptable to risk managers. An alternative VaR computation based on tick-by-tick data and a new time series operator technique is shown to have similar properties, except for two advantages: distinctly reduced noise and availability of up-to-date results at each tick.

The time series operators can also be used in the formulation of old and new generating processes of time series. This opens new ways to develop process equations with new properties, also for inhomogeneous time series.

A preferred embodiment comprises a method for determining value-at-risk based on tick-by-tick financial data. Major steps of the method comprise the following: (1) financial market transaction data is electronically received by a computer; (2) the received financial market transaction data is electronically; (3) a time series z is constructed that models the received financial market transaction data; (4) an exponential moving average operator is constructed; (5) an operator is constructed that is based on the exponential moving average operator; (6) a causal operator $\Omega[z]$ is constructed that is based on the iterated exponential moving average operator; (7) values of predictive factors are calculated; (8) the values calculated by the computer are stored in a computer readable medium, and (9) value-at-risk is calculated from the values stored in step (8).

DETAILED DESCRIPTION OF PREFERRED EMBODIMENTS

1. The Time Series Operator Technique

In this description, only a minimum of a description of time series operators is given, so the applications of the following sections can be understood. The theory of the time series operators is explained in U.S. Provisional Application No. 60/200,743

1.1 Inhomogeneous Time Series

A time series z consists of elements or ticks $z_i$ at times $t_i$. The sequence of these time points is required to be growing, $t_i > t_{i-1}$.

A general time series is inhomogeneous, meaning that the sampling times $t_i$ are irregular. For a homogeneous time series, the sampling times are regularly spaced, $t_i - t_{i-1} = \delta t$.

For some discussions and derivations, a continuous-time version of z has to be assumed: z(t). However, the operator methods that are eventually applied only need the discrete time series $(t_i, z_i)$.

The letter x is used to represent the time series of logarithmic middle prices, $x=(\ln p_{bid}+\ln P_{ask})/2$. This quantity is used in the applications.

1.2 Operators

Figure 1:
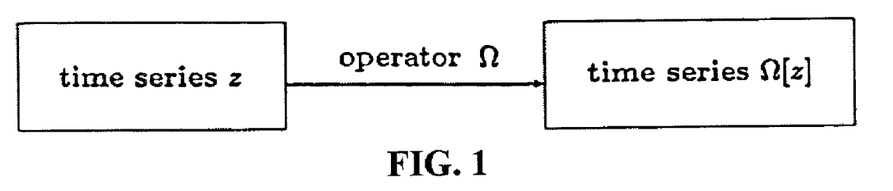
FIG. 1 illustrates the relationship between a time series Z and a time series operator $\Omega$.

An operator $\Omega$, mapping from the space of time series into itself, is depicted in FIG. 1. The resulting time series $\Omega[z]$ has a value of $\Omega[z](t)$ at time t. Important examples are moving average operators and more complex operators that construct a time series of volatility from a time series of prices.

Linear and translation-invariant operators are equivalent to a convolution with a kernel $\omega$:

$$\Omega[z](t) = \int_{-\infty}^{t} \omega(t-t')z(t')dt' \qquad (1)$$

A causal kernel has $\omega(t)=0$ for all $t<0$. No information from the "future" is used. If $\omega(t)$ is non-negative, $\omega[z]$ is a weighted moving average of z whose kernel should be normalized:

$$\int_{-\infty}^{t} \omega(t-t')dt' = \int_{0}^{\infty} \omega(t)dt = 1 \qquad (2)$$

Figure 2:
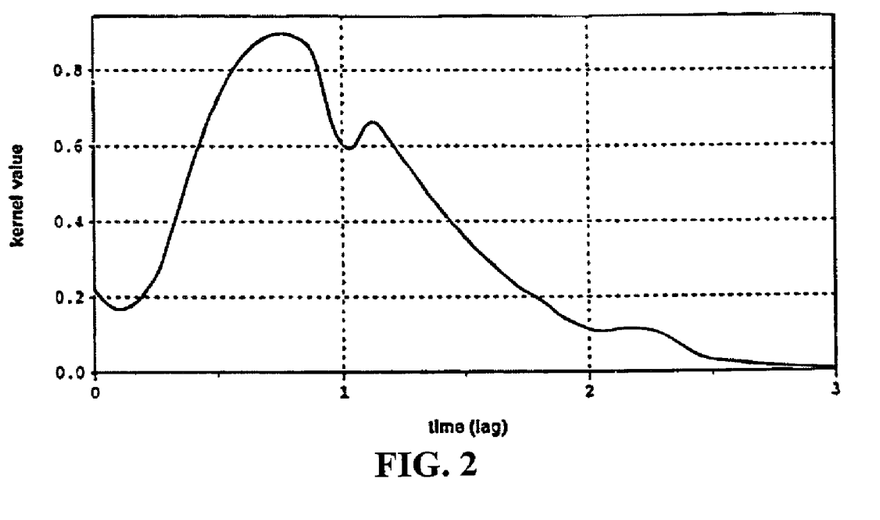
FIG. 2 depicts an example of a causal kernel $\omega(t)$ of a moving average.

The kernel $\omega(t)$ is the weighting function of the past. FIG. 2 depicts an example of a causal kernel $\omega(t)$ of a moving average.

The range of an operator is the first moment of its kernel:

$$r = \int_{-\infty}^{\infty} \omega(t)t\,dt \qquad (3)$$

This indicates the characteristic depth of the past covered by the kernel.

Operators are useful for several reasons, as will be shown. One important aspect is to replace individual ticks from the market by local short-term averages of ticks. This mirrors the view of traders who consider not only the most recent tick but also the prices offered by other market makers within a short time interval.

1.3 The Simple EMA Operator

Figure 3:
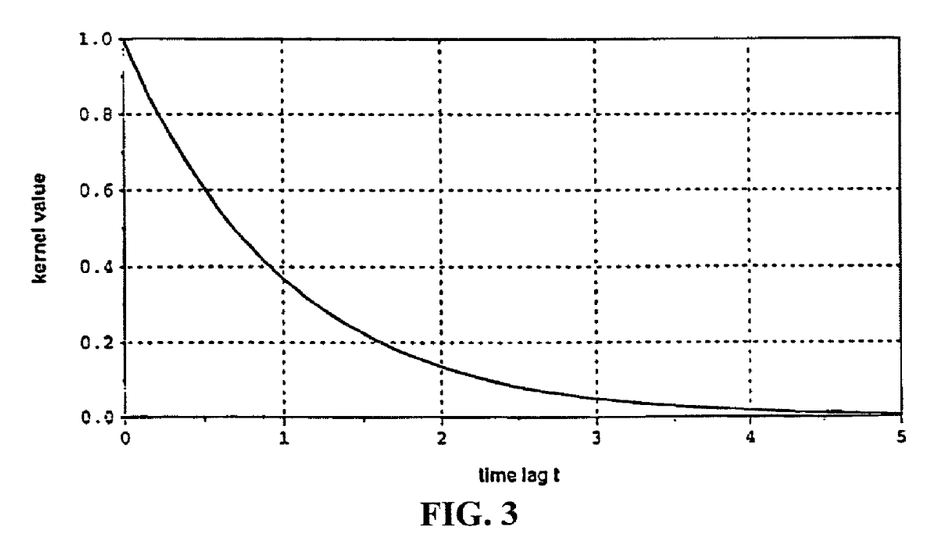
FIG. 3 depicts a graph of a kernel of a simple EMA operator.

The Exponential Moving Average (EMA) operator is a simple example of an operator. It is written EMA $[\tau; z]$ and has an exponentially decaying kernel (as shown in FIG. 3 which depicts a graph of the kernel, with $\tau=1$):

$$\omega(t) = ema(t) = \frac{e^{-t/\tau}}{\tau} \qquad (4)$$

According to eqs. (3) and (4), the range of the operator EMA[$\tau$; z] and its kernel is $$r=\tau \qquad (5)$$

The variable $\tau$ thus characterizes the depth of the past of the EMA.

The values of EMA[$\tau$; z](t) can be computed by the convolution of eq. (1), if z(t) is known in continuous time. This implies an integration whose numerical computation for many time points t is costly. Fortunately, there is an iteration formula that makes this computation much more efficient and, at the same time, solves the problem of discrete data. This means that we do not need to know the whole function z(t); we just need the discrete time series values $z_i=z(t_i)$ at irregularly spaced time points $t_i$. The EMAs are calculated by the following iteration formula:

$$EMA[\tau; z](t_n)=\mu EMA\ [\tau; z]\ (t_{n-1})+(1-\mu)\ z\ (t_n)+(\mu-\nu)\\ [z(t_n)-z(t_{n-1})] \qquad (6)$$

with $$\mu = e^{-\alpha},\ \alpha = \frac{t_n - t_{n-1}}{\tau} \qquad (7)$$

$$\nu = \frac{1-\mu}{\alpha} \qquad (8)$$

This variable $\nu$ is related to the problem of using discrete data in a convolution defined in continuous time. We need an assumption on the behavior of z(t) between the discrete time points $t_i$. Eq. (8) is based on the assumption of linear interpolation between points; other formulas for $\nu$ are implied by other interpolation assumptions, as explained in U.S. Provisional Application No. 60/200,743. In the case of assuming the value of the old tick for the whole interval before the new tick, the correct formula is $$\nu=1 \qquad (9)$$

For a homogeneous time series, $\mu$ and $\nu$ are constants. A homogeneous time series can alternatively be regarded as a truly discrete time series to which interpolation does not apply. This is mentioned here because it is a popular approach used by traders. For such a discrete time series, $t_n-t_{n-1}$ is defined to be 1, and the following definition is appropriate:

$$\mu = \nu = \frac{1}{1+\alpha} = \frac{\tau}{\tau+t_n-t_{n-1}} = \frac{\tau}{\tau+1} \qquad (10)$$

The range of an operator for a genuine discrete time series has a new definition:

$$r = \sum_{i=0}^{\infty} \omega_i i.$$

For EMA, this means $r=\mu/(1-\mu)=\tau$ with $\omega_i=(1-\mu)\mu^i$. The $\mu$ and $\nu$ values resulting from eq. (10) are very similar to those of eqs. (7) and (8) as long as $\alpha$ is small.

The iteration equation (6) is computationally efficient, extremely so when compared to a numerical convolution based on eq. (1). No other operator can be computed as efficiently as the simple EMA operator. However, there are means to use the iteration equation (6) as a tool to efficiently compute operators with other kernels, as shown below.

An iteration formula is not enough. We have to initialize EMA [$\tau$; z] ($t_0$) at the start of the time series. For this, we can take $z_0=z$ ($t_0$) or another typical value of z. This choice introduces an initial error of EMA [$\tau$; z] ($t_0$) which decreases exponentially with time. Therefore, we also need a build-up period for EMA [$\tau$; z]: a time period over which the values of EMA [$\tau$; z] should not yet be applied because of their initial error. Build-up periods should be multiples of $\tau$, e.g., $5\tau$. The choice of a large enough build-up period is discussed in U.S. Provisional Application No. 60/200,743.

1.4 The Operator EMA [$\tau$, n; z]

Time series operators can be convoluted: a time series resulting from a an operator can be mapped by another operator. This is a powerful method to generate new operators with different kernels.

The EMA [$\tau$, n; z] operator results from the repeated application of the same simple EMA operator. The following recursive definition applies:

$$EMA\ [\tau, k; z] = EMA\ [\tau;\ EMA\ [\tau, k-1; z]] \tag{11}$$

with EMA [$\tau$, 1; z]=EMA [$\tau$; z]. The computationally efficient iteration formula of the simple EMA, eq. (6), can again be used; we have to apply it recursively (n times) for each new tick ($t_i$, $z_i$). For $\nu$, we insert eq. (8) which is based on a linear interpolation assumption between ticks. (This assumption is just a good approximation in some cases, as discussed in U.S. Provisional Application No. 60/200,743.

Figure 4:
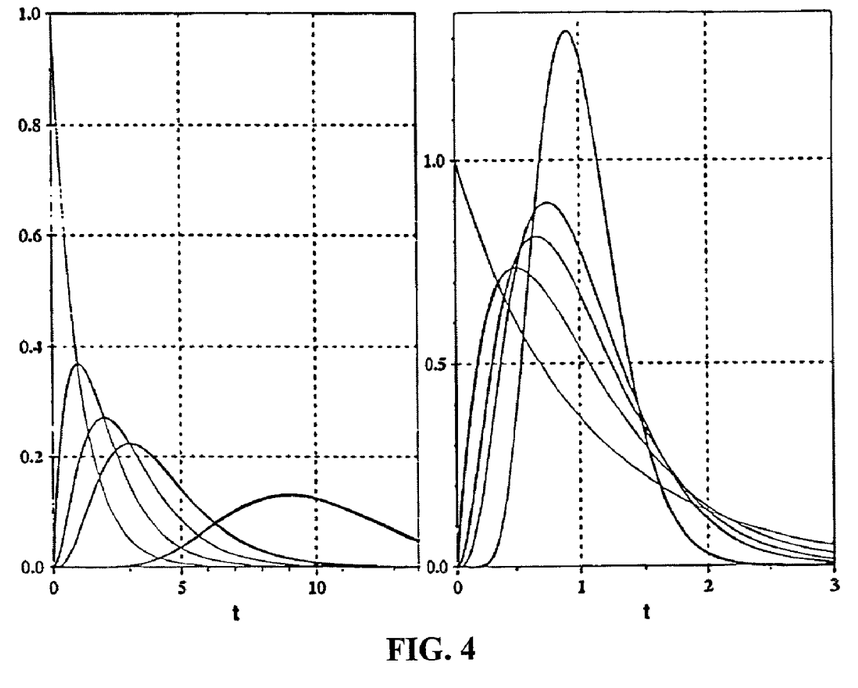
FIG. 4 depicts graphs of selected EMA operator kernels.

The operator EMA [$\tau$, n; z] has the following kernel:

$$ema[\tau, n] = \frac{1}{(n-1)!}\left(\frac{t}{\tau}\right)^{(n-1)} \frac{e^{-t/\tau}}{\tau} \tag{12}$$

This kernel is plotted in FIG. 4, which depicts graphs of selected EMA operator kernels, for several n (n=1 (thin), 2, 3, 4, and 10 (bold); left graph is for $\tau 3$=1, right graph is for r=n$\tau$=1). For large n (e.g., n=10 in FIG. 4), the mass of the kernel is concentrated in a relatively narrow region around a time lag of n$\tau$. The corresponding operator can thus be seen as a smoothed backshift operator.

The family of functions of eq. 12 is related to Laguerre polynomials which are orthogonal with respect to the measure $e^{-t}$ (for $\tau$=1).

Operators, i.e., their kernels, can be linearly combined. This is a powerful method to generate more operators. Linear combinations of EMA[$\tau$, n; z] operators with different n but identical $\tau$ values have kernels that correspond to expansions in Laguerre polynomials. This means that any kernel can be expressed as such a linear combination. The convergence, however, of the Laguerre expansion may be slow.

In practice, a small set of useful operators can be prepared with all the kernels needed. Aside from the discussed expansion, it is also possible to linearly combine kernels with different $\tau$ values. Some useful types of combined operators are presented in U.S. Provisional Application No. 60/200,743.

1.5 The Operator MA[$\tau$, n; z]

Figure 5:
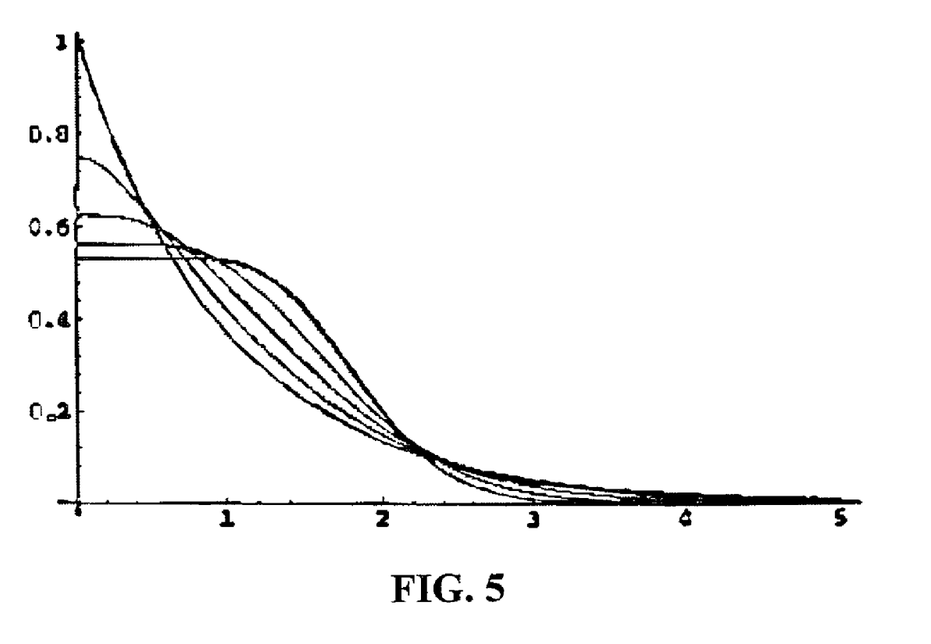
FIG. 5 depicts graphs of selected MA operator kernels.

The moving average (MA) operator has kernels with useful properties as shown in FIG. 5, which depicts graphs of selected MA operator kernels (n=1, 2, 4, 8, and 16; $\tau$=1). It is constructed as a sum of EMA[$\tau$, n; z] operators:

$$MA[\tau, n] = \frac{1}{n}\sum_{k=1}^{n} EMA[\tau', k] \text{ with } \tau' = \frac{2\tau}{n+1} \tag{13}$$

The variable $\tau'$ is chosen such that the range of MA[$\tau$, n] is r=$\tau$, independent of n. For n=1, we obtain a simple EMA operator, for n=$\infty$ the rectangularly shaped kernel of a simple moving average with constant weight up to a limit of $2\tau$. This simple rectangular moving average has a serious disadvantage in its dynamic behavior: additional noise when old observations are abruptly dismissed from the rectangular kernel area. Kernels with finite n are better because of their smoothness; the memory of old observations fades gradually rather than abruptly.

The formula for the MA[$\tau$, n] kernel is $$ma[\tau, n](t) = \frac{n+1}{n} \frac{e^{-t/\tau'}}{2\tau} \sum_{k=0}^{n-1} \frac{1}{k!}\left(\frac{t}{\tau'}\right)^k \tag{14}$$

Many other kernel forms can be constructed through different linear combinations of EMA[$\tau$, n; z] and other operators.

1.6 From Returns to Differentials

Most statistics in finance is based on returns: price changes rather than prices. Simple returns have a rather noisy behavior over time; we often want differences between local averages of x: smoothed returns.

Smoothed returns are computed by differential operators. Examples:

x—EMA[$\tau$, n; x], where the EMA replaces x (t–$\tau$). This is used by the application of section 3.2.

EMA[$\tau_1$, $n_1$]–EMA[$\tau_2$, $n_2$], with $\tau_1 < \tau_2$ or $n_1 < n_2$.

Figure 6:
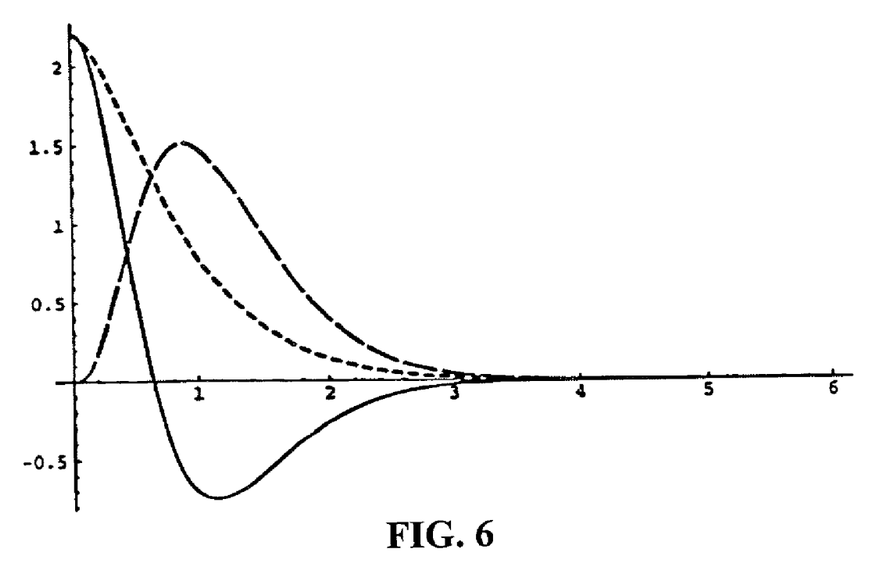
FIG. 6 depicts graphs of selected terms of a kernel of a differential operator $\Delta$.

$\Delta[\tau]$=$\gamma$\{EMA[$\alpha\tau$, 1]+EMA[$\alpha\tau$, 2]–2 EMA[$\alpha\beta\tau$, 4]\}, with $\gamma$=1.22208, $\beta$=0.65 and $\alpha^{-1}$=$\gamma$(8$\beta$–3). The is normalized, so $\Delta[\tau$, 1]=0, $\Delta[\tau$, t]=1. The kernel of this differential operator, described in U.S. Provisional Application No. 60/200,743, is plotted in FIG. 6, which depicts graphs of selected terms of a kernel of a differential operator $\Delta$ (full curve is kernel of $\Delta[\tau]$ ($\tau$=1); dotted curve is the first two terms of the operator; dashed curve is the last term 2 EMA[$\alpha\beta\tau$, 4]).

The expectation value of squared smoothed returns may differ from that of the corresponding simple returns. This has to be accounted for when comparing the two concepts, for example in terms of a factor c in eq. (20).

1.7 Volatility Measured by Operators

Volatility is a central term in risk measurement and finance in general, but there is no unique, universally-accepted definition. There are volatilities derived from option market prices and volatilities computed from diverse model assumptions. In this description, the focus is on historical volatility: a volatility computed from recent data of the underlying instrument with a minimum of parameters and model assumptions.

For computing the time series of such a volatility, a time series operator is again the suitable tool. We first define the nonlinear moving norm operator:

$$MNorm[\tau, p; z] = \{MA[\tau; |z|^p]\}^{1/p} \tag{15}$$

This operator is based on a linear MA operator (where we are free to choose any positive, causal kernel); it is nonlinear only because a nonlinear function of the basic time series variable z is used. MNorm[$\tau$, p; z] is homogeneous of degree 1.

The volatility of a time series x can now be computed with the help of the moving norm operator:

$$\text{Volatility}[\tau_1, \tau_2, p; x] = MNorm\left[\frac{\tau_1}{2}, p; \Delta[\tau_2; x]\right] \tag{16}$$

$$= \{MA[\tfrac{\tau_1}{2}; |\Delta[\tau_2; x]|^p]\}^{1/p} \quad (17)$$

This is the moving norm of (smoothed) returns. With p=2, it is a particular version of the frequently used RMS value. However, some researchers had and have good reasons to choose a lower value such as p=1 in their special studies.

Eq. (17) is based on a moving average (MA) and a differential ($\Delta$) operator. In principle, we may choose any MA and $\Delta$ operator according to our preference. In the applications of section 3, this choice is made explicit.

The volatility definition of eq. (17), as any definition of historical volatility, necessarily has two timing parameters:
1. the size of the return measurement intervals: $\tau_2$;
2. the size of the total moving sample: $\tau_1$, often $>>\tau_2$; defined as the double range of the used MA. The MA operator has a range (center of gravity of the kernel) of $\tau_1/2$.

2. Application: Volatility Computation in Risk Management

Computing recent volatility is a central ingredient of risk assessment in risk management. Here it serves as an example to demonstrate the usefulness and superiority of time series operators.

The RiskMetrics™ method (see J. P. Morgan, 1996, *RiskMetrics—technical document*, Technical report, J. P. Morgan and International marketing—Reuters Ltd.) is chosen as a well-known example. First it is shown to be a special application of the time series operator technique. Then a better volatility computation method, also based on the time series operator technique, is proposed. Thus two approaches are compared:
1. The RiskMetrics method, based on an IGARCH model with working-daily data.
2. A tick-by-tick alternative, following RiskMetrics as closely as possible, based on time series operators.

In both cases, squared volatility is defined as the expectation $\sigma^2$ of squared, working-daily changes of the logarithmic middle price x. This is for the sake of a meaningful comparison; it does not imply that using squared returns is necessarily the best choice for an optimal volatility definition.

2.1 Conventional Computation Based on Daily Data

The RiskMetrics method is based on an IGARCH model. Its volatility formula gives the conditional expectation of the squared return assuming IGARCH:

$$\sigma^2(t)=\mu\sigma^2(t-1\ \text{wday})+(1-\mu)[x(t)-x(t-1\ \text{wday})]^2 \quad (18)$$

with $\mu$=0.94. This is just an EMA iteration which can also be written in our operator notation:

$$\sigma^2(t)=EMA[\tau=15.67\ \text{wdays}; [x(t)-x(t-1\ \text{wday})]^2] \quad (19)$$

evaluated at discrete time points separated by 1 working day (=1 wday); with EMA range $\tau=\mu/(1-\mu)$ in working days, following eq. (10).

Thanks to the regularity of the underlying homogeneous time series, $\mu$=0.94 is a constant. In general, the constancy of $\mu$ makes the operator technique particularly efficient for homogeneous time series.

Figure 7:
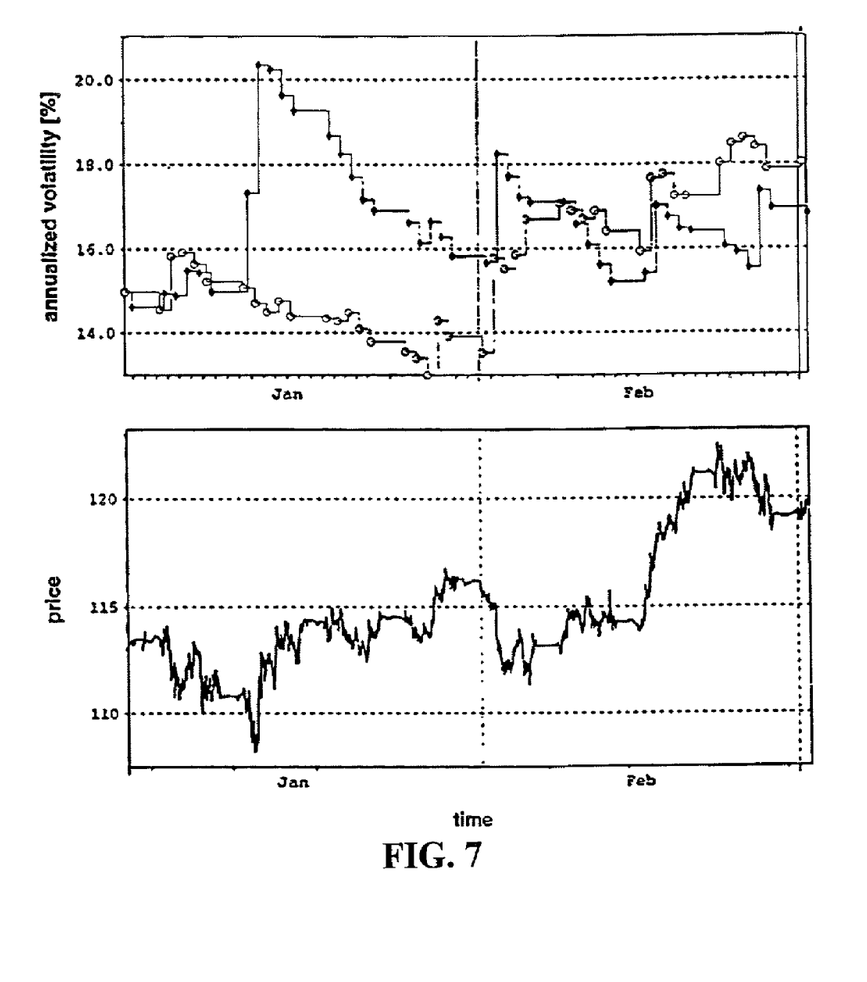
FIG. 7 illustrates volatility of standard RiskMetrics.

FIG. 7, which illustrates volatility of standard RiskMetrics, shows the resulting volatility as a function of time, in an empirical example from the foreign exchange (FX) market: USD/JPY data in January and February 1999. The volatility is computed only once per working day, at a given time of day; the resulting volatility value is valid until it is replaced by a new one, one working day later. Circles show data sampled at 7 am GMT, and diamonds show data sampled at 5 pm GMT. Computations are independent. The price is plotted against time on the lower graph.

In FIG. 7, two such volatilities are plotted. The difference between the two curves solely originates from the choice of time when the raw data x is sampled and the volatility is computed by eq. (18) or (19). One curve is sampled at 7 am GMT which is a time in the late afternoon of East Asian time zones—a suitable daytime for the daily risk calculations of an East Asian risk manager. The other curve is sampled at 5 pm GMT—a suitable daytime for a risk manager in London.

The differences between the two curves are surprisingly large: up to 25%, an alarming uncertainty for risk managers. Risk levels are linked to a bank's capital through the capital adequacy rule, so differences in risk measurements have a major impact on banking. In our case, two risk managers measure very different volatility and thus risk levels for the same financial instrument, just because they live in different time zones. A difference can persist over weeks, as shown in FIG. 7. This figure is just an example. The same surprisingly strong effect can be found also for other financial instruments, sampling periods, and choices of time of day for sampling.

Both deviating volatility values cannot be right at the same time; there must be an error in these values. This error is of a stochastic nature; there is no systematic bias dependent on the daytime. In FIG. 7, the difference between the two curves is neither always positive nor negative; it changes its sign.

FIG. 7 demonstrates the large stochastic error of the RiskMetrics method. The large size of this error has two main reasons:
1. The rather small range of the kernel of some 16 working days. The number of independent observations is limited. We cannot essentially change this fact, because the choice of a short range is also motivated by the goal of fast adaptivity to new market events.
2. The results depend on only one observation per day, taken at a certain time. All the other information on prices of the day is thrown away. The value at that time may be little representative for the full day: it may be located on top of a short-lived local peak of the price curve. This is indeed the reason for the large deviations of the two curves in FIG. 7. The effect is exacerbated by the known fact that returns have a heavy-tailed distribution function: extreme (intra-day) events dominate the statistics.

The focus here is not so much the behavior of RiskMetrics (IGARCH), but the problems of using homogeneous, daily data in general, no matter which GARCH-type or other model is investigated. The significance of most results can be improved by using all the available information, tick by tick, as shown in the next section.

2.2 Tick-by-Tick Volatility Computation

For the sake of a fair comparison, a tick-by-tick volatility computation is introduced that follows RiskMetrics as closely as possible. There are two innovative modifications:

The squared volatility $\sigma^2(t)$ is computed at every available tick, not just once per working day.

Simple returns are replaced by operator-based, smoothed returns.

Nothing is changed otherwise; the sampling range of 15.67 working days and the working-daily nature of (smoothed) returns are preserved.

The new volatility measure is again defined in operator notation (where "wdays" stands for working days):

$$\sigma^2 = cEMA[\tau=15.67 wdays;(x-EMA[\tau=1\ wday,4;x])^2] \quad (20)$$

This is just a special case of eq. (16). The computation is efficiently done at every new tick, repeatedly using the iteration formula (6). This works not only for the simple EMA but also for EMA[$\tau$, 4; x] as explained in section 2.4.

The constant c compensates for the fact that we use smoothed returns x–EMA[$\tau$, 4; x] as introduced in section 2.6 instead of the simple returns of section 3.1. In the case of x following a Gaussian random walk, the theoretically correct value is c=128/93. Using this factor eliminates a systematic bias of the tick-by-tick volatility as compared to the RiskMetrics volatility.

Eq. (20) is computed on a special business time scale defined as follows. The 49 weekend hours from Friday 8 pm GMT to Sunday 9 pm GMT are compressed to the equivalent of only 1 hour outside the weekend. This fully corresponds to the time scale of RiskMetrics which omits the weekend days. A more sophisticated and appropriate choice of the business time scale would be the υ-time of Dacorogna et al. (1992) (Dacorogna M. M. Müller U. A., Nagler R. J., Olsen R. B., and Pictet O. V., 1993, *A geographical model for the daily and weekly seasonal volatility in the FX market*, Journal of International Money and Finance, 12(4), 413-438), but this is avoided here in order to keep the approach as close to RiskMetrics as possible.

Figure 8:
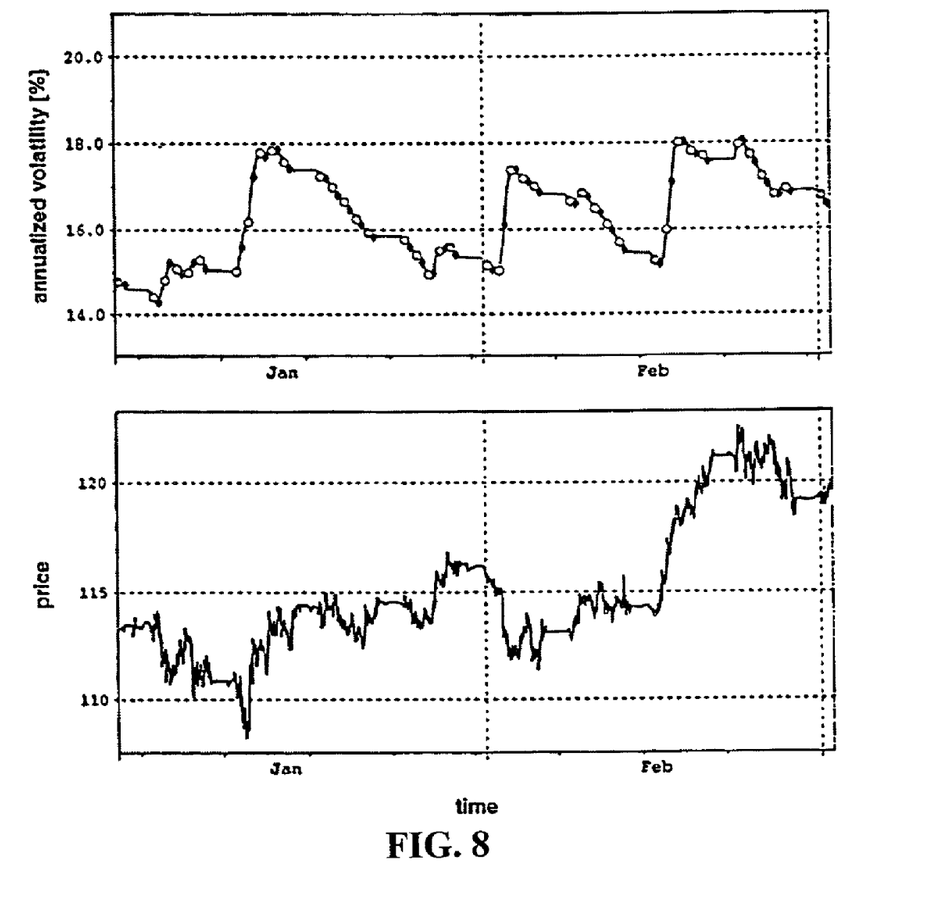
FIG. 8 illustrates operator-based tick-by-tick volatility.

FIG. 8, which illustrates operator-based tick-by-tick volatility, shows the resulting volatility as a function of time. The same financial instrument and sampling period is studied as in FIG. 7. High-frequency data is available here. Now, the large differences between values at 7 am GMT and 5 pm GMT have vanished. The observations at these times appear as points on one continuous, consistent curve. In fact, we can obtain volatility values at any time of day now, not just once or twice a day. A risk manager in London essentially measures the same risk of the instrument as a risk manager in East Asia, as should be expected in normal situations. The risk levels deviate only if a dramatic event between the two daytimes of measurement happens. This is natural; the operator-based volatility quickly reacts to dramatic events, as can be seen in FIG. 8.

The variations of the volatility level over time are moderate in FIG. 8. The extreme volatility minima and minima of FIG. 7 which are mostly due to stochastic noise have vanished. The new tick-by-tick volatility has less stochastic noise than the RiskMetrics volatility, although the moving sample range of 15.67 working days is the same.

Figure 9:
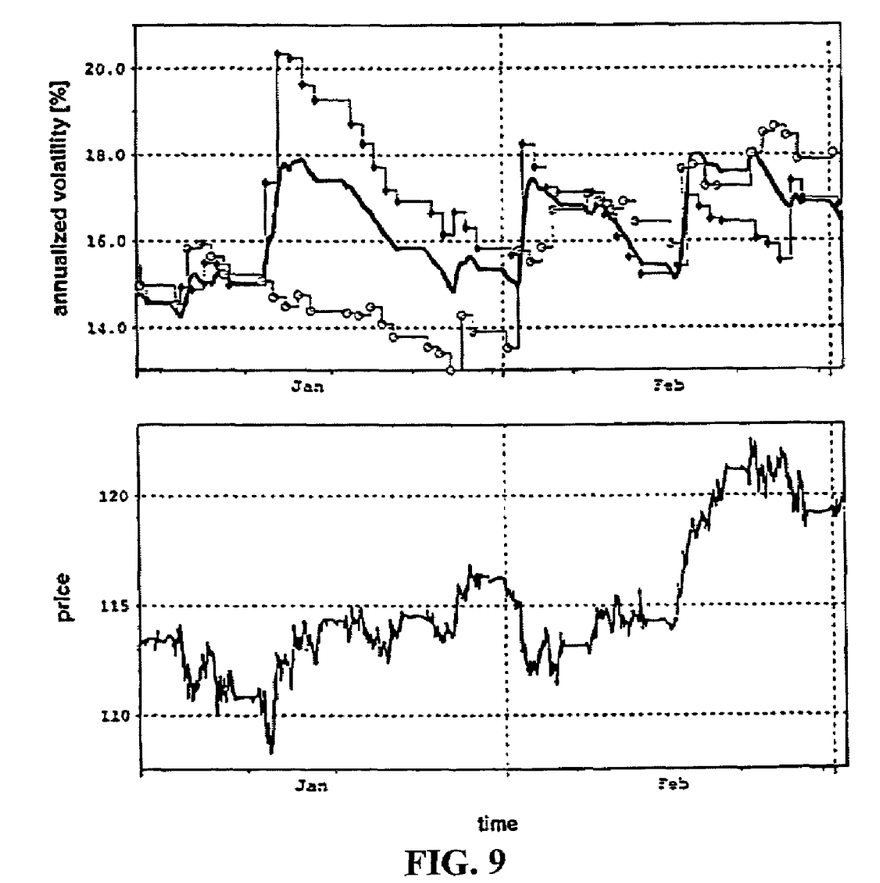
FIG. 9 compares RiskMetrics to operator-based volatility.

The curves of FIGS. 7 and 8 are combined in FIG. 9, which compares RiskMetrics to operator-based volatility. Here, we can see that the tick-by-tick volatility (bold curve) has a dynamic behavior similar to the known volatilities while avoiding extreme oscillations due to stochastic noise.

The lower noise level of the tick-by-tick volatility is now plausible, but we need scientific evidence for this. In the general case, such evidence can be gained through Monte-Carlo studies based on a certain process assumption, comparing the error variances of the RiskMetrics volatility and the tick-by-tick volatility. In the case of a Gaussian random walk, we have even stronger evidence: by using continuously-overlapping returns instead of non-overlapping returns, the error variance of the empirically determined $\sigma^2$ is reduced to ⅔ of the original value.

The tick-by-tick operator is indeed using (almost) continuously overlapping returns. In addition to this, it is based on smoothed rather than simple returns, which also leads to a reduction of stochastic noise.

Other advantages of tick-by-tick, operator-based methods are the efficient computation based on iterations and the updating at every new tick. Thanks to fast updates, the volatility measure can quickly react to new market events such as shocks, at any time of day.

2.3 VaR Computation in Real-Time

Conventional Value-at-Risk (VaR) computations are done once a day, usually in the evening. Traders and portfolio managers typically do not know their current risk; they just know yesterday evening's risk. What they really need is a real-time VaR computation, updated as quickly as they can change their positions.

The tick-by-tick operator proposed in section 3.2 and eq. (20) is a tool to make a real-time VaR possible.

A real-time VaR computed according to these guidelines would still be somewhat similar to RiskMetrics, except for the substantial benefits of lower noise and a higher updating frequency. There are many criticisms of RiskMetrics that would apply to it, too. Some researchers, for example, replace the IGARCH model by another GARCH-type model. Other researchers focus on the behavior of extreme price changes which may follow other laws than average-size changes. Moreover, return observations over intervals other than daily (for example, hourly or weekly) returns contain valuable information that should also be used in a VaR computation.

3. Process Equations Based on Operators

Processes of the ARMA and GARCH families can be expressed in terms of time series operators, as we have seen for IGARCH in eq. (19). The squared conditional volatility of a GARCH(1,1) process, for example, can be written as follows:

$$\sigma^2(t) = c + a\sigma^2(t') + b[x(t')-x(t'-\Delta t)]^2 \quad (21)$$

where t'=t–$\Delta$t. The following alternative notation is based on a simple EMA operator:

$$\sigma^2(t) = \frac{c}{1-a} + \frac{b}{1-a} EMA\left[\frac{a}{1-a};[x(t')-\Delta t]^2\right] \quad (22)$$

This rephrased form of GARCH(1,1) is a starting point of interesting new developments. Initially, it applies to a discrete, homogeneous time series in the sense of eq. (10), but it allows for a direct and efficient computation of the GARCH(1, 1) volatility from inhomogeneous data, since the operator technique is also suited to inhomogeneous time series.

Moreover, eq. (22) can be modified to obtain other processes. The kernel of the EMA operator can, for example, be replaced by other kernels. The return x(t')–x(t'–$\Delta$t) can be replaced by a smoothed return computed by a differential operator which reflects the perception of market participants better that the simple return.

Dacorogna et al. (1998) (Dacorogna M. M., Müller U. A., Olsen R. B., and Pictet O. V., 1998, *Modelling short-term volatility with GARCH and HARCH models*, published in "Nonlinear Modelling of High Frequency Financial Time Series" edited by Christian Dunis and Bin Zhou, John Wiley, Chichester, 161-176) have introduced the EMA-HARCH process to model some empirical facts of high-frequency data in finance: the long memory of volatility, the fat tails of the return distribution and the asymmetric causality between fine-grained (high-resolution) and coarse-grained (low-resolution) volatilities as found by Müller et al. (1997) (Müller U. A., Dacorogna M. M., Davé R. D., Olsen R. B., Pictet O. V., and von Weizsäcker J. E., 1997, *Volatilities of different time resolutions—analyzing the dynamics of market components,* Journal of Empirical Finance, 4(2-3), 213-239). This is one of the first processes whose equation is written with the help of a time series operator:

$$\sigma^2(t) = c + \sum_{j=1}^{n} C_j \sigma_j^2(t) \quad (23)$$

The "partial volatilities" $\sigma_j^2$ correspond to market segments and are written in terms of the EMA operator:

$$\sigma_j^2(t) = EMA\left[\frac{k_{j+1} - k_j}{2} \Delta t; [x(t') - x(t' - k_j \Delta t)]^2\right] \quad (24)$$

with $k_1 = 1$ and $k_j = 4^{j-2} + 1$ for $j > 1$.

4. CONCLUSIONS

Most financial markets produce inhomogeneous data, irregularly spaced in time. The time series operators described herein are able to directly use inhomogeneous data to estimate statistical variables such as volatilities. This computation is made efficient by using iteration formulas. The operator technique efficiently works also for homogeneous, equally spaced data.

Starting from the simple exponential moving average (EMA) operator, large families of operators with different kernels and different purposes can be constructed. A wider overview of these more complex operators, which are still computationally efficient, is described in U.S. Provisional Application No. 60/200,743. One example is a tick-by-tick Fourier analysis on a moving sample.

Thanks to averaging, the operator technique often produces results with less noise (lower stochastic errors) than conventional methods based on homogeneous time series. This is also the case for the main application of the above description: volatility of daily returns as needed for Value-at-Risk (VaR) computations. The conventional RiskMetrics methods have a rather high stochastic error which is demonstrated in a new way: volatility is computed twice with daily data. In one case, the data is always sampled at 7 am GMT (late afternoon in East Asia), in the other case at 5 pm (late afternoon in London). The results of the two computations can differ by some 25% for many days in a row—an embarrassing fact for risk managers. The tick-by-tick alternative of a preferred embodiment based on time series operators does not have this sensitivity against the choice of the sampling time of day and has less noise, while keeping the essential preferred characteristics of the known RiskMetrics method: it is still based on daily returns and still has a range (center of gravity of the kernel) of around 16 working days.

The same technique is preferably used to determine a real-time VaR, updated with every new incoming tick from a market, with less noise than the corresponding results from conventional methods. Many methods of calculating VaR from volatility are known in the art (see, for example, Chapter 14: Value at Risk of *Options, Futures, and Other Derivatives,* by John C. Hull ($4^{th}$ ed. 2000).

Finally, the operator technique can be used to formulate time series generation process equations. This is possible for well-known processes such as GARCH and new, more complex processes such as EMA-HARCH. The formulation in terms of operators has many advantages: flexibility and applicability to irregularly-spaced time series.

Although the subject invention has been described with reference to preferred embodiments, numerous modifications and variations can be made that will still be within the scope of the invention. No limitation with respect to the specific embodiments disclosed herein is intended or should be inferred.

What is claimed is:

1. A method of determining value-at-risk, comprising the steps of:
  electronically receiving financial market transaction data over an electronic network;
  electronically storing in a computer-readable medium said received financial market transaction data;
  constructing an inhomogeneous time series z that represents said received financial market transaction data;
  constructing an exponential moving average operator;
  constructing an iterated exponential moving average operator based on said exponential moving average operator;
  constructing a time-translation-invariant, causal operator $\Omega[z]$ that is a convolution operator with kernel $\omega$ and that is based on said iterated exponential moving average operator;
  electronically calculating values of one or more predictive factors relating to said time series z, wherein said one or more predictive factors are defined in terms of said operator $\Omega[z]$;
  electronically storing in a computer readable medium said calculated values of one or more predictive factors; and
  electronically calculating value-at-risk from said calculated values.

2. The method of claim 1, wherein said operator $\Omega[z]$ has the form:

$$\Omega[z](t) = \int_{-\infty}^{t} dt' \omega(t - t') z(t') = \int_{0}^{\infty} dt' \omega(t') z(t - t').$$

3. The method of claim 1, wherein said exponential moving average operator $EMA[\tau; z]$ has the form:

$$EMA[\tau; z] = \mu EMA[\tau; z](t_{n-1}) + (\nu - \mu) z_{n-1} + (1 - \nu) z_n,$$

where $$\alpha = \frac{t_n - t_{n-1}}{\tau},$$

$$\mu = e^{-\alpha}, \text{ and}$$

$\nu$ depends on a chosen interpolation procedure.

4. The method of claim 1, wherein said operator $\Omega[z]$ is a differential operator $\Delta[\tau]$ that has the form:
  $\Delta[\tau] = \gamma(EMA [\alpha\tau, 1] + EMA[\alpha\tau 2] - 2 EMA [\alpha\beta\tau, 4])$,
  where $\gamma$ is fixed so that the integral of the kernel of the differential operator from the origin to the first zero is 1; α is fixed by a normalization condition that requires Δ[τ; c]=0 for a constant c; and β is chosen in order to get a short tail for the kernel of the differential operator Δ[τ].

5. The method of claim 4 wherein said one or more predictive factors comprises a return of the form r[τ]=Δ[τ; x], where x represents a logarithmic price.

6. The method of claim 1 wherein said one or more predictive factors comprises a momentum of the form x−EMA[τ; x], where x represents a logarithmic price.

7. The method of claim 1 wherein said one or more predictive factors comprises a volatility.

8. The method of claim 7 wherein said volatility is of the form:

Volatility[τ,τ', p;z]=MNorm $$Volatility[\tau, \tau', p; z] = MNorm\left[\frac{\tau}{2}, p; \Delta[\tau'; z]\right],$$

where
MNorm[τ,p;z]=MA[τ;|z|$^p$]$^{1/p}$, and $$MA[\tau, n] = \frac{1}{n}\sum_{k=1}^{n} EMA[\tau', k], \quad \text{with } \tau' = \frac{2\tau}{n+1},$$

and where p satisfies 0<p≦2, and τ' is a time horizon of a return r[τ]=Δ[τ; x], where x represents a logarithmic price.

9. The method of claim 1, wherein said exponential moving average operator EMA[τ; z] has the form:

$$EMA[\tau; z] = \mu EMA[\tau; z](t_{n-1}) + (\nu - \mu)z_{n-1} + (1 - \nu)z_n,$$

where $$\alpha = \frac{t_n - t_{n-1}}{\tau},$$

$$\mu = e^{-\alpha}, \text{ and}$$

$$\nu = \frac{1-\mu}{\alpha},$$

corresponding to a linear interpolation procedure.

10. The method of claim 1, wherein said exponential moving average operator EMA[τ; z] has the form:

$$EMA[\tau; z] = \mu EMA[\tau; z](t_{n-1}) + (\nu - \mu)z_{n-1} + (1 - \nu)z_n,$$

where $$\alpha = \frac{t_n - t_{n-1}}{\tau},$$

$$\mu = e^{-\alpha}, \text{ and}$$

ν=1, corresponding to a previous point interpolation procedure.

11. The method of claim 1, wherein said exponential moving average operator EMA[τ; z] has the form:

$$EMA[\tau; z] = \mu EMA[\tau; z](t_{n-1}) + (\nu - \mu)z_{n-1} + (1 - \nu)z_n,$$

where $$\alpha = \frac{t_n - t_{n-1}}{\tau},$$

$$\mu = e^{-\alpha}, \text{ and}$$

ν=μ, corresponding to a next point interpolation procedure.

* * * * *